United States Patent
Chen et al.

(10) Patent No.: US 11,004,583 B2
(45) Date of Patent: May 11, 2021

(54) MAGNETO-DIELECTRIC MATERIAL COMPRISING HEXAFERRITE FIBERS, METHODS OF MAKING, AND USES THEREOF

(71) Applicant: ROGERS CORPORATION, Chandler, AZ (US)

(72) Inventors: Yajie Chen, Brighton, MA (US); Karl Edward Sprentall, Scottsdale, AZ (US); Murali Sethumadhavan, Acton, MA (US)

(73) Assignee: ROGERS CORPORATION, Chandler, AZ (US)

( * ) Notice: Subject to any disclaimer, the term of this patent is extended or adjusted under 35 U.S.C. 154(b) by 269 days.

(21) Appl. No.: 16/067,181

(22) PCT Filed: Jan. 18, 2017

(86) PCT No.: PCT/US2017/013862
§ 371 (c)(1),
(2) Date: Jun. 29, 2018

(87) PCT Pub. No.: WO2017/127388
PCT Pub. Date: Jul. 27, 2017

(65) Prior Publication Data
US 2019/0013128 A1    Jan. 10, 2019

Related U.S. Application Data

(60) Provisional application No. 62/279,964, filed on Jan. 18, 2016.

(51) Int. Cl.
*H01F 1/34* (2006.01)
*H01F 1/37* (2006.01)
(Continued)

(52) U.S. Cl.
CPC ............. *H01F 1/348* (2013.01); *C04B 35/26* (2013.01); *C04B 35/2608* (2013.01);
(Continued)

(58) Field of Classification Search
CPC ............. H01F 1/348; H01F 1/37; H01F 1/375
See application file for complete search history.

(56) References Cited

U.S. PATENT DOCUMENTS 4,725,490 A    2/1988  Goldberg
4,957,812 A *  9/1990  Aoki .................. G11B 5/70678
                                                 252/62.56
(Continued)

FOREIGN PATENT DOCUMENTS

CN    101100374 A    1/2008
CN    101104556      1/2008
(Continued)

OTHER PUBLICATIONS

Deng, et al; Effect of Bi arid Mo Doping on Magnetic arid Sintered Characteristics of MgCuZn Ferrite, Journal of Inorganic Materials, 2008, pp. 670-672, vol. 23 No. 4.
(Continued)

*Primary Examiner* — Matthew E. Hoban
(74) *Attorney, Agent, or Firm* — Cantor Colburn LLP

(57) ABSTRACT

In an embodiment, a magneto-dielectric material comprises a polymer matrix; a plurality of hexaferrite microfibers; wherein the magneto-dielectric material has a permeability of 2.5 to 7, or 2.5 to 5 in an x-direction parallel to a broad surface of the magneto-dielectric material and a magnetic loss tangent of less than or equal to 0.03; as determined at 1 GHz, or 1 to 2 GHz.

20 Claims, 3 Drawing Sheets

(51) Int. Cl.
    *C04B 35/26*     (2006.01)
    *C04B 35/622*     (2006.01)
    *C08G 61/08*     (2006.01)
    *C08L 47/00*     (2006.01)
    *H01F 1/153*     (2006.01)

(52) U.S. Cl.
CPC ........ *C04B 35/62231* (2013.01); *C08G 61/08* (2013.01); *C08L 47/00* (2013.01); *H01F 1/15375* (2013.01); *C04B 2235/3206* (2013.01); *C04B 2235/3213* (2013.01); *C04B 2235/3215* (2013.01); *C04B 2235/3224* (2013.01); *C04B 2235/3241* (2013.01); *C04B 2235/3244* (2013.01); *C04B 2235/3251* (2013.01); *C04B 2235/3256* (2013.01); *C04B 2235/3262* (2013.01); *C04B 2235/3275* (2013.01); *C04B 2235/3279* (2013.01); *C04B 2235/3281* (2013.01); *C04B 2235/3284* (2013.01); *C04B 2235/3298* (2013.01); *C04B 2235/408* (2013.01); *C04B 2235/422* (2013.01); *C04B 2235/522* (2013.01); *C04B 2235/526* (2013.01); *C04B 2235/5264* (2013.01); *C04B 2235/5296* (2013.01); *C04B 2235/721* (2013.01); *C04B 2235/722* (2013.01); *C04B 2235/767* (2013.01)

(56) References Cited

U.S. PATENT DOCUMENTS

| | | | |
|---|---|---|---|
| 5,110,651 | A | 5/1992 | Massard et al. |
| 5,143,583 | A | 9/1992 | Marchessault et al. |
| 9,596,755 | B2 | 3/2017 | Sethumadhavan et al. |
| 2003/0059609 | A1 | 3/2003 | Rodgers |
| 2004/0054029 | A1* | 3/2004 | Fujiki ............... H05K 9/0083 523/137 |
| 2006/0154052 | A1 | 7/2006 | Waffenschmidt et al. |
| 2009/0101873 | A1* | 4/2009 | Tan ............... H05K 9/0083 252/519.31 |
| 2010/0052992 | A1 | 3/2010 | Okamura et al. |
| 2010/0231433 | A1 | 9/2010 | Tishin et al. |
| 2016/0099498 | A1 | 4/2016 | Pance et al. |
| 2016/0113113 | A1 | 4/2016 | Sethumadhavan et al. |
| 2016/0276072 | A1 | 9/2016 | Sethumadhavan et al. |

FOREIGN PATENT DOCUMENTS

| | | |
|---|---|---|
| CN | 101545159 A | 9/2009 |
| CN | 101914821 | 12/2010 |
| CN | 102408202 A | 4/2012 |
| CN | 101851814 B | 11/2012 |
| CN | 103243417 A | 8/2013 |
| CN | 103304186 A | 9/2013 |
| CN | 103630674 B | 3/2014 |
| CN | 103436994 B | 10/2015 |
| JP | 2006290917 A | 10/2006 |
| WO | 2016064459 A1 | 4/2016 |
| WO | 2016123598 A1 | 8/2016 |

OTHER PUBLICATIONS

International Search Report; International Application No. PCT/US2017/013862; International Filing Date: January 18, 2017; dated May 11, 2017; 6 pages.

Jing et al., "Magnetic and Dielectric Properties of Barium Ferrite Fibers/poly(vinylidene fluoride) Composite Films," Journal of Polymer Research, Kluwer Academic Publishers-Consultants Bureau, NL, Apr. 20, 2011, pp. 2017-2021, vol. 18, No. 6.

Lee et al. "Role of Small Permeability in Gigahertz Ferrite Antenna Performance," IEEE Magnetics Letter, 2013, vol. 4.

Pullar, "Hexagonal Ferrite Fibres and Nanofibres," Trans Tech Publications, 2016, pp. 1-68, vol. 241.

Pullar, "Magnetic Properties of Aligned Co2Z Hexagonal Z-Ferrite Fibers," International Journal of Applied Ceramic Technology 2014, pp. 451-456, vol. 11, No. 3.

Written Opinion; International Application No. PCT/US2017/013862; International Filing Date: Jan. 18, 2017; dated May 11, 2017; 10 pages.

\* cited by examiner

MAGNETO-DIELECTRIC MATERIAL COMPRISING HEXAFERRITE FIBERS, METHODS OF MAKING, AND USES THEREOF

CROSS REFERENCE TO RELATED APPLICATIONS

This application is a National Stage application of PCT/US2017/013862, filed Jan. 18, 2017, which claims the benefit of U.S. Provisional Application No. 62/279,964, filed Jan. 18, 2016, both of which are incorporated by reference in their entirety herein.

BACKGROUND

The present disclosure relates generally to a magneto-dielectric material comprising hexaferrite fibers, methods of making, and uses thereof.

Newer designs and manufacturing techniques have driven electronic components to increasingly smaller dimensions, for example, components such as inductors on electronic integrated circuit chips, electronic circuits, electronic packages, modules, and housings, and antennas. One approach to reducing electronic component size has been the use of magneto-dielectric materials as substrates. In particular, ferrites, ferroelectrics, and multiferroics have been widely studied as functional materials with enhanced microwave properties. However, these materials are not entirely satisfactory, in that they may not provide the desired bandwidth or they exhibit a high magnetic loss at high frequencies such as in the gigahertz range.

There accordingly remains a need in the art for a magneto-dielectric material with a low magnetic loss in the gigahertz range.

BRIEF SUMMARY

Disclosed herein is a magneto-dielectric material comprising a magneto-dielectric material comprising a polymer matrix; a plurality of hexaferrite microfibers; wherein the magneto-dielectric material has a permeability of 2.5 to 7, or 2.5 to 5 in an x-direction parallel to a broad surface of the magneto-dielectric material and a magnetic loss tangent of less than or equal to 0.03; as determined at 1 gigahertz (GHz), or 1 to 2 GHz.

A method of making the above magneto-dielectric material comprises injection molding the polymer matrix and the plurality of hexaferrite microfibers; wherein the polymer matrix comprises a thermoplastic polymer.

A method of making the above magneto-dielectric material comprises reaction injection molding the polymer matrix and the plurality of hexaferrite microfibers; wherein the polymer matrix comprises a thermoset polymer.

Articles comprising the magneto-dielectric material and the composite material are also described, including an antenna, a transformer, an anti-electromagnetic interface material, or an inductor.

The above described and other features are exemplified by the following Figures and Detailed Description.

BRIEF DESCRIPTION OF THE DRAWINGS

The following Figures are exemplary embodiments, wherein the like elements are numbered alike.

DETAILED DESCRIPTION

Magneto-dielectric materials having a high permeability and a low magnetic loss tangent at microwave frequencies can allow for the miniaturization of components such as antennas without the loss in bandwidth that often occurs in high dielectric constant materials. A magneto-dielectric material was therefore developed that comprises a polymer matrix and a plurality of hexaferrite microfibers. The magneto-dielectric material can have one or both of a magnetic loss tangent of less than or equal to 0.03 and a permeability of 2.5 to 7, or 2.5 to 5 at 1 GHz, or 1 to 2 GHz, for example, in an x-direction parallel to a broad surface of the magneto-dielectric material. The magneto-dielectric material with such a low magnetic loss can advantageously be used in high frequency applications such as in antenna applications.

The hexaferrite microfibers can comprise a Z-type hexaferrite, a W-type hexaferrite, a U-type hexaferrite, an X-type hexaferrite, a Y-type hexaferrite, or a combination comprising at least one of the foregoing, specifically, a Z-type hexaferrite. The hexaferrite microfibers can further comprise Ni, Co, Cr, Au, Ag, Cu, Gd, Pt, Ba, Bi, Ir, Mn, Mg, Mo, Nb, Nd, Sr, V, Zn, Zr, N, C, or a combination comprising at least one of the foregoing. The hexaferrite microfibers can comprise a cobalt Z-type hexaferrite. The cobalt Z-type hexaferrite having the formula: $(Ba_zSr_{(3-z)})Co_{(2+x)}Mo_xFe_{(y-2x)}O_{41}$, wherein x is 0.01 to 0.2, y is 20 to 24, and z is 0 to 3.

The hexaferrite microfibers can have an aspect ratio referring to a longest dimension to a shortest dimension (for example, a fiber length to a fiber diameter) of greater than or equal to 10, or greater than or equal to 50. An average diameter of the hexaferrite microfibers can be 0.3 to 10 micrometers, or 1 to 5 micrometers. An average length of the hexaferrite microfibers can be 100 to 5,000 micrometers, or 500 to 3,000 micrometers. An average length of the hexaferrite microfibers can be 1 to 15 millimeters, or 2 to 10 millimeters, or 1 to 5 millimeters.

The hexaferrite microfibers can comprise solid fibers or hollow fibers. If the hexaferrite microfibers comprise hollow fibers, the hollow fibers can have one or both of an average inner diameter of 0.01 to 1 micrometer and an average outer diameter of 0.3 to 20 micrometers, or 0.3 to 10 micrometers. The presence of the hollow fibers can help to reduce the permittivity of the magneto-dielectric material.

The hexaferrite microfibers can be formed by arc discharge, templating, electrospinning, an aqueous organic gel method, an organic gel method, a thermal decomposition method, and the like.

The magneto-dielectric material can comprise 10 to 60 volume percent (vol %), or 20 to 50 vol % of hexaferrite microfibers based on the total volume of the magneto-dielectric material.

Figure 1:
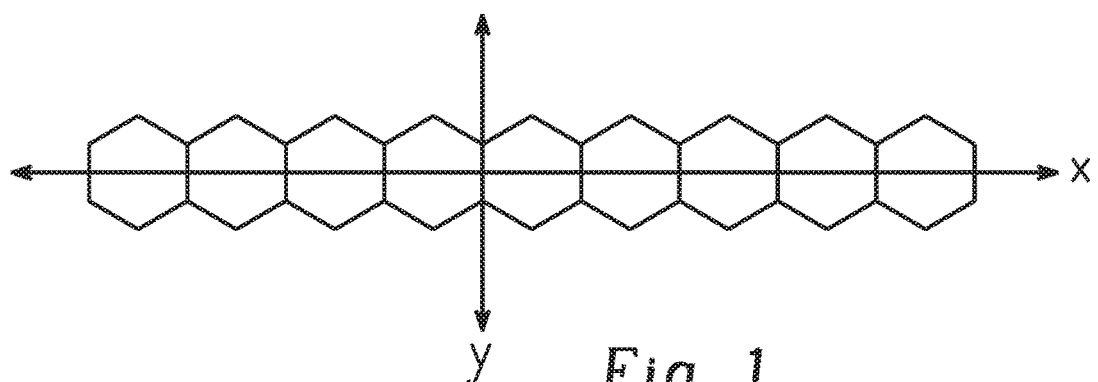
FIG. 1 is an illustration of an embodiment of a hexaferrite microfiber having the grains oriented along the x-y plane.
Figure 2:
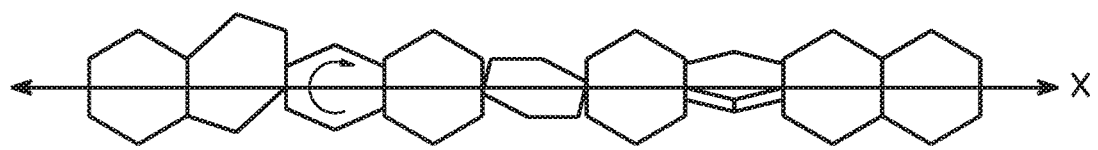
FIG. 2 is an illustration of an embodiment of a hexaferrite microfiber having the grains oriented along the x-y plane.

The hexaferrite microfibers can be polycrystalline. The hexaferrite microfibers can have a grain size of 0.3 to 20 micrometers. The grains of the magneto-dielectric material can be oriented along an x-y plane of the microfiber, i.e., parallel to the longest dimension of the microfiber. For example, 50 to 100% by number of the grains can be oriented along (parallel to) the x-y plane. FIG. 1 and FIG. 2 are illustrations of embodiments of a plurality of grains in a hexaferrite microfiber. FIG. 1 illustrates an ideal case where all of the grains (100%) are oriented along and in the x-y plane. FIG. 2 illustrates a hexaferrite microfiber where greater than 50% of the grains are oriented in the x-y plane.

Within the magneto-dielectric material, the plurality of hexaferrite microfibers can be completely randomly oriented (for an isotropic material), semi-oriented, or directionally oriented with respect to an x-y plane of the material. In the completely randomly oriented material, the plurality of hexaferrite microfibers are randomly oriented along the x, y, and z planes of the material.

Figure 3:
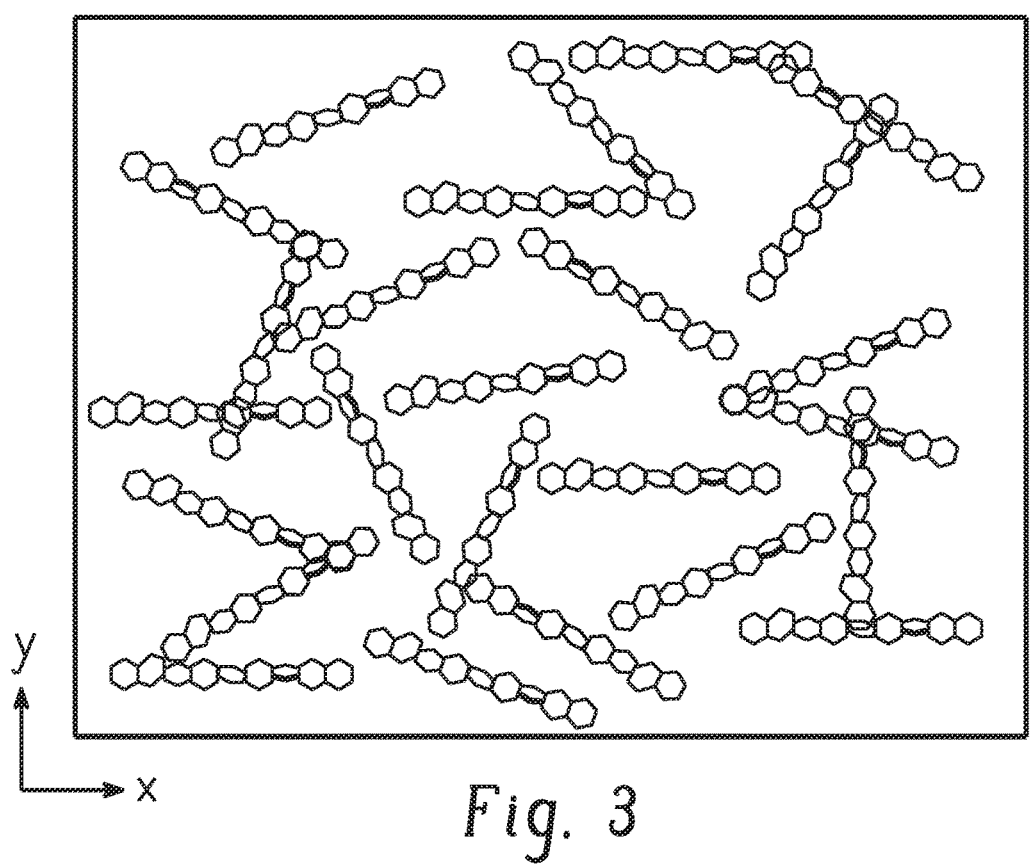
FIG. 3 is an illustration of an embodiment of a magneto-dielectric material comprising a plurality of hexaferrite microfibers of FIG. 2 randomly oriented in the x-y plane of the magneto-dielectric substrate.

In the semi-oriented material, the plurality of the hexaferrite microfibers are oriented parallel to the x-y plane, but randomly oriented within the x-y plane. FIG. 3 is a top view illustration of a semi-oriented material having an x-y plane parallel to a broad surface of the magneto-dielectric material. The plurality of the hexaferrite fibers are oriented parallel to the x-y plane, but randomly oriented within the x-y plane.

Figure 4:
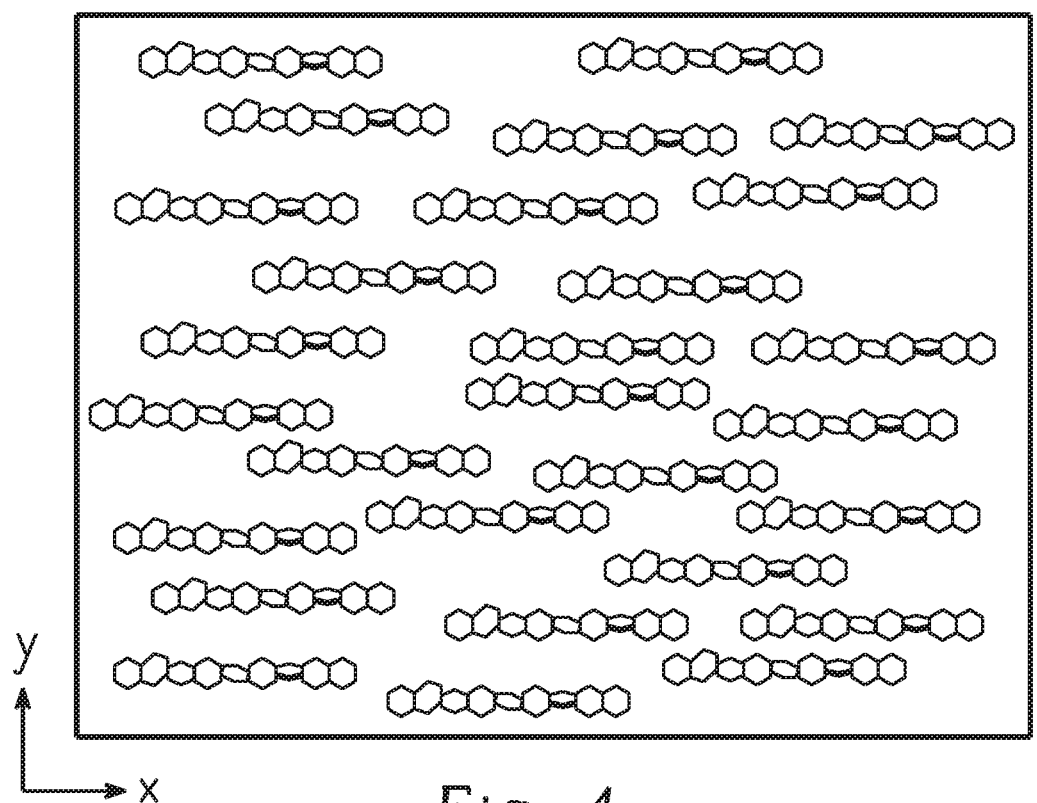
FIG. 4 is an illustration of an embodiment of a magneto-dielectric material comprising a plurality of hexaferrite microfibers of FIG. 2 oriented in an x-direction of the x-y plane of the magneto-dielectric substrate.
Figure 5:
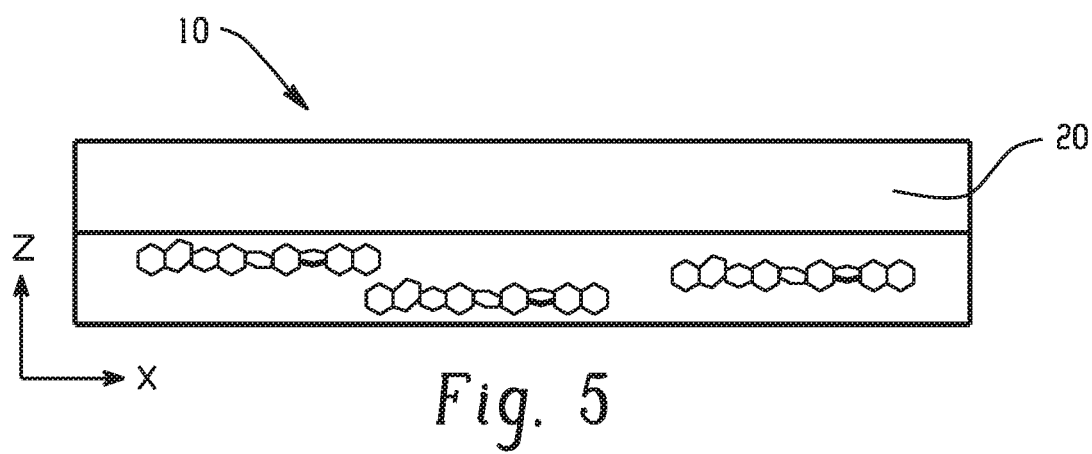
FIG. 5 is an illustration of an embodiment of a conductive layer disposed on the magneto-dielectric material.

In the directionally-oriented magneto-dielectric material, the plurality of the hexaferrite microfibers are oriented parallel to the x-y plane and parallel to the x-direction. FIG. 4 is a top view illustration of a semi-oriented material having an x-y plane parallel to a broad surface of the magneto-dielectric material. The plurality of the hexaferrite fibers are aligned in the x-direction of the x-y plane, as well as in the x-direction of the x-y plane. FIG. 5 is an illustration of the x-z plane of the magneto-dielectric material 10 of FIG. 4, i.e., a cross-sectional view of the material of FIG. 4. FIG. 5 shows the plurality of the hexaferrite fibers aligned parallel to the x-axis of the x-y plane, but not within an x-z plane. FIG. 5 further illustrates that the magneto-dielectric material can further comprise conductive layer 20. Optionally, the conductive layer 20 can be patterned.

The magneto-dielectric material can comprise a dielectric filler. The dielectric filler can comprise, for example, titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, or a combination comprising at least one of the foregoing.

The dielectric filler can be surface treated with a silicon-containing coating, for example, an organofunctional alkoxy silane coupling agent. A zirconate or titanate coupling agent can be used. Such coupling agents can improve the dispersion of the filler in the polymeric matrix and reduce water absorption of the finished composite circuit substrate. The filler component can comprise 70 to 30 vol % of fused amorphous silica as a secondary filler based on the weight of the filler.

The magneto-dielectric material can comprise 5 to 60 vol %, or 10 to 50 vol %, or 15 to 45 vol % of the dielectric filler based on the total volume of the magneto-dielectric material.

The magneto-dielectric material can comprise a plurality of hollow ceramic tubes. The magneto-dielectric material comprising the hollow ceramic tubes can have one or more of an increased mechanical strength and a higher characteristic impedance as compared to the same magneto-dielectric material that does not comprise the hollow ceramic tubes.

The magneto-dielectric material can comprise a flame retardant. The flame retardant can be halogenated or unhalogenated. The flame retardant can be present in the magneto-dielectric material in an amount of 0 to 30 vol % based on the volume of the magneto-dielectric material.

The flame retardant can be inorganic and can be present in the form of particles. The inorganic flame retardant can comprise a metal hydrate, having, for example, a volume average particle diameter of 1 to 500 nanometers (urn), specifically, 1 to 200 nm, or 5 to 200 nm, or 10 to 200 nm; alternatively the volume average particle diameter is 500 nm to 15 micrometers, for example, 1 to 5 micrometers. The metal hydrate can comprise a hydrate of a metal such as Mg, Ca, Al, Fe, Zn, Ba, Cu, Ni, or a combination comprising at least one of the foregoing. Hydrates of Mg, Al, or Ca can be used, for example, aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Composites of these hydrates can be used, fix example, a hydrate containing Mg and at least one of Ca, Al, Fe, Zn, Ba, Cu, and Ni. A composite metal hydrate can have the formula $MgM_x(OH)_y$, wherein M is Ca, Al, Fe, Zn, Ba, Cu, or Ni, x is 0.1 to 10, and y is 2 to 32. The flame retardant particles can be coated or otherwise treated to improve dispersion and other properties.

Organic flame retardants can be used, alternatively or in addition to the inorganic flame retardants. Examples of organic flame retardants include melamine cyanurate, fine particle size melamine polyphosphate, various other phosphorus-containing compounds such as aromatic phosphinates, diphosphinates, phosphonates, phosphates, polysilsesquioxanes, siloxanes, and halogenated compounds such as hexachloroendomethylenetetrahydrophthalic acid (HET acid), tetrabromophthalic acid, and dibromoneopentyl glycol. A flame retardant (such as a bromine-containing flame retardant) can be present in an amount of 20 phr (parts per hundred parts of resin) to 60 phr, specifically, 30 to 45 phr based on the total weight of the resin. Examples of brominated flame retardants include Saytex BT93 W (ethylene bistetrabromophthalimide), Saytex 120 (tetradecabromodiphenoxy benzene), and Saytex 102 (decabromodiphenyl oxide). The flame retardant can be used in combination with a synergist, for example, a halogenated flame retardant can be used in combination with a synergists such as antimony trioxide, and a phosphorus-containing flame retardant can be used in combination with a nitrogen-containing compound such as melamine.

The hexaferrite microfibers themselves can increase the flame retardancy of the magneto-dielectric material. For example, the magneto-dielectric material can have an improved flame retardancy as compared to the same material but without the hexaferrite microfibers.

The magneto-dielectric material can have improved flammability. For example, the magneto-dielectric material can have a UL94 V1 or V0 rating at 1.6 millimeters (mm).

The magneto-dielectric material can operate at a high operating frequency of 0.5 to 50 GHz, or 1 to 2 GHz, or 1 GHz.

The magneto-dielectric material can have a permeability of 2.5 to 7, or 2.5 to 5 as determined at 1 GHz, or 1 to 2 GHz. The magneto-dielectric material can have a permeability of 2.5 to 7, or 2.5 to 5 as determined at 1 GHz, or 1 to 2 GHz as determined in an x-direction parallel to a broad surface of the magneto-dielectric material. The permeability in the x-direction is 0.75 to 2 times greater than the permeability in the z-direction that is perpendicular to the broad surface.

The magneto-dielectric material can have a low magnetic loss tangent of less than or equal to 0.03, or less than or equal to 0.01 as determined at 1 GHz, or 1 to 2 GHz.

The magneto-dielectric material can have a low permittivity of less than or equal to 10, or less than or equal to 8, as determined at 1 GHz, or 1 to 2 GHz. When the magneto-dielectric material comprises hollow hexaferrite microfibers, the magneto-dielectric material can have a low permittivity of less than or equal to 5 as determined at 1 GHz, or 1 to 2 GHz.

The magneto-dielectric material can have a low dielectric loss tangent of less than or equal to 0.005, or less than or equal to 0.001 as determined at 1 GHz, or 1 to 2 GHz.

The polymer matrix can comprise a thermoplastic or a thermoset polymer. The polymer can comprise a polycarbonate, a polystyrene, a polyphenylene ether, a polyimide (e.g., polyetherimide), a polybutadiene, a polyacrylonitrile, a poly($C_{1-12}$)alkylmethacrylate (e.g., polymethylmethacrylate (PMMA)), a polyester (e.g., polyethylene terephthalate, polybutylene terephthalate, polythioester), a polyolefin (e.g., polypropylene (PP), high density polyethylene (HDPE), low density polyethylene (LDPE), linear low density polyethylene (LLDPE)), a polyamide (e.g., polyamideimide), a polyarylate, a polysulfone (e.g., polyarylsulfone, polysulfonamide), a polyphenylene sulfide, a polyphenylene oxide, a polyethers (e.g., polyether ketone (PEK), polyether ether ketone (PEEK), polyethersulfone (PES)), a polyacrylic, a polyacetal, a polybenzoxazoles (e.g., polybenzothiazole, polybenzothiazinophenothiazine), a polyoxadiazole, a polypyrazinoquinoxaline, a polypyromellitimide, a polyquinoxaline, a polybenzimidazole, a polyoxindole, a polyoxoisoindoline (e.g., polydioxoisoindoline), a polytriazine, a polypyridazine, a polypiperazine, a polypyridine, a polypiperidine, a polytriazole, a polypyrazole, a polypyrrolidine, a polycarborane, a polyoxabicyclononane, a polydibenzofuran, a polyphthalide, a polyacetal, a polyanhydride, a polyvinyl (e.g., a polyvinyl ether, a polyvinyl thioether, a polyvinyl alcohol, a polyvinyl ketone, a polyvinyl halide (such as polyvinylchloride), a polyvinyl nitrile, a polyvinyl ester), a polysulfonate, a polysulfide, a polyurea, a polyphosphazene, a polysilazane, a polysiloxane, a fluoropolymer (e.g., polyvinyl fluoride (PVF), polyvinylidene fluoride (PVDF), fluorinated ethylene-propylene (FEP), polytetrafluoroethylene (PTFE), polyethylenetetrafluoroethylene (PETFE)), or a combination comprising at least one of the foregoing. The polymer can comprise a poly(ether ether ketone), a polyphenylene oxide, a polycarbonate, a polyester, an acrylonitrile-butadiene-styrene copolymer, styrene-butadiene copolymer, a styrene-ethylene-propylene copolymer, a nylon, or a combination comprising at least one of the foregoing. The polymer can comprise a liquid crystal polymer. The polymer can comprise an acrylonitrile-butadiene-styrene copolymer. The polymer can comprise a high temperature nylon. The polymer can comprise a polyethylene (such as a high density polyethylene). The polymer matrix can comprise a polyolefin, a polyurethane, a polyethylene (such as polytetrafluoroethylene), a silicone polymer (such as polydimethylsiloxane), a polyether (such as poly ether ketone and polyether ether ketone), poly(phenylene sulfide), or a combination comprising at least one of the foregoing. The polymer matrix can comprise a polyolefin, a fluorinated polymer (such as PTFE), a polyurethane, a silicone (such as polydimethylsiloxane), a liquid crystal polymer, a polyether (such as poly ether ketone and polyether ether ketone), poly(phenylene sulfide), or a combination comprising at least one of the foregoing. The polymer matrix can comprise an epoxy-cyanate-ester blend, for example, The polymer of the polymer matrix composition can comprise a thermosetting polybutadiene or polyisoprene. As used herein, the term "thermosetting polybutadiene or polyisoprene" includes homopolymers and copolymers comprising units derived from butadiene, isoprene, or mixtures thereof. Units derived from other copolymerizable monomers can also be present in the polymer, for example, in the form of grafts. Copolymerizable monomers include, but are not limited to, vinylaromatic monomers, for example, substituted and unsubstituted monovinylaromatic monomers such as styrene, 3-methylstyrene, 3,5-diethylstyrene, 4-n-propylstyrene, alpha-methylstyrene, alpha-methyl vinyltoluene, para-hydroxystyrene, para-methoxystyrene, alpha-chlorostyrene, alpha-bromostyrene, dichlorostyrene, dibromostyrene, tetra-chlorostyrene, and the like; and substituted and unsubstituted divinylaromatic monomers such as divinylbenzene, divinyltoluene, and the like. Combinations comprising at least one of the foregoing copolymerizable monomers can also be used. Thermosetting polybutadienes or polyisoprenes include, but are not limited to, butadiene homopolymers, isoprene homopolymers, butadiene-vinylaromatic copolymers such as butadiene-styrene, isoprene-vinylaromatic copolymers such as isoprene-styrene copolymers, and the like.

The thermosetting polybutadiene or polyisoprene polymers can also be modified. For example, the polymers can be hydroxyl-terminated, methacrylate-terminated, carboxylate-terminated, or the like. Post-reacted polymers can be used, such as epoxy-, maleic anhydride-, or urethane-modified polymers of butadiene or isoprene polymers. The polymers can also be crosslinked, for example, by divinylaromatic compounds such as divinyl benzene, e.g., a polybutadiene-styrene crosslinked with divinyl benzene. Polymers are broadly classified as "polybutadienes" by their manufacturers, for example, Nippon Soda Co., Tokyo, Japan, and Cray Valley Hydrocarbon Specialty Chemicals, Exton, Pa. Mixtures of polymers can also be used, for example, a mixture of a polybutadiene homopolymer and a poly(butadiene-isoprene) copolymer. Combinations comprising a syndiotactic polybutadiene can also be useful.

A curing agent can be used to cure the thermosetting polybutadiene or polyisoprene composition to accelerate the curing reaction. Curing agents can comprise organic peroxides, for example, dicumyl peroxide, t-butyl perbenzoate, 2,5-dimethyl-2,5-di(t-butyl peroxy)hexane, α,α-di-bis(t-butyl peroxy)diisopropylbenzene, 2,5-dimethyl-2,5-di(t-butyl peroxy) hexyne-3, or a combination comprising at least one of the foregoing. Carbon-carbon initiators, for example, 2,3-dimethyl-2,3 diphenylbutane can be used. Curing agents or initiators can be used alone or in combination. The amount of curing agent can be 1.5 to 10 weight percent (wt %) based on the total weight of the polymer in the polymer matrix.

The polymer matrix can comprise a norbornene type polymer derived from a monomer composition comprising a norbornene monomer, a norbornene-types monomer, or a combination comprising at least one of the foregoing.

The polynorbornene matrix can be derived from a monomer composition comprising one or both of a norbornene monomer and a norbornene-type monomer, as well as other optional co-monomers. A repeat unit derived from norbornene is shown below in Formula (I).

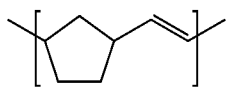

(I)

Norbornene-type monomers include tricyclic monomers (such as dicyclopentadiene and dihydrodicyclopentadiene); tetracyclic monomers (such as tetracyclododecene); and pentacyclic monomers (such as tricyclopentadiene); heptacyclic monomers (such as tetracyclopentadiene). A combination comprising at least one of the foregoing can be used. One of the foregoing monomers can be used to obtain a homopolymer or two or more can be combined to obtain a copolymer.

The norbornene-type monomer can comprise dicyclopentadiene such that the polynorbornene matrix comprises a repeat unit derived from the dicyclopentadiene as illustrated below in Formula (II).

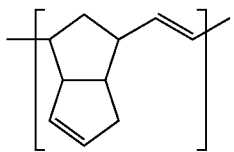

(II)

The polynorbornene matrix can comprise 50 to 100 wt %, specifically, 75 to 100 wt %, more specifically, 95 to 100 wt % of repeat units derived from dicyclopentadiene based on the total weight of the polynorbornene matrix.

The norbornene-type monomer can comprise a functional group such as an alkyl group (e.g., methyl, ethyl, propyl, butyl, and the like), an alkylidene group (e.g., ethylidene, and the like), an aryl group (e.g., phenyl, tolyl, naphthyl, and the like), a polar group (e.g., ester, ether, nitrile, halogen, and the like), or a combination comprising at least one of the foregoing. An example of a norbornene-type monomer with an ethylidene functional group is ethylidene norbornene, is shown below in Formula (III).

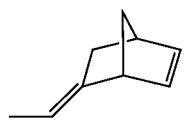

(III)

The functionalized repeat unit can be present in the polynorbornene matrix in an amount of 5 to 30 wt %, specifically, 15 to 28 wt %, more specifically, 20 to 25 wt % based on the total weight of the polynorbornene matrix.

The polynorbornene matrix can contain less than or equal to 20 wt % of at least one of a repeat unit derived from a copolymerizable monomer based on the total weight of the polynorbornene matrix. The copolymerizable monomer can comprise a monocycloolefin, a bicycloolefin, or a combination comprising at least one of the foregoing. The monocycloolefin and the bicycloolefin can each independently comprise 4 to 16 carbon atoms, specifically, 4 to 8, or 8 to 12 carbon atoms. The bicycloolefin can comprise 1 to 4 double bonds, specifically, 2 to 3 double bonds. The copolymerizable monomer can comprise norbornadiene, 2-norbornene, 5-methyl-2-norbornene, 5-hexyl-2-norbornene, 5-ethylidene-2-norbornene, vinylnorbornene, 5-phenyl-2-norbornene, cyclobutene, cyclopentene, cyclopentadiene, cycloheptene, cyclooctene, cyclooctadiene, cyclodecene, cyclododecene, cyclododecadiene, cyclododecatriene, norbornadiene, or a combination comprising at least of the foregoing.

The polynorbornene matrix can be formed by ring-opening metathesis polymerization (ROMP) of the monomer in the presence of a catalyst system comprising a metathesis catalyst and an activating agent. The catalyst system can optionally comprise a moderator, a fluorinated compound, a chelating agent, a solvent, or a combination comprising at least one of the foregoing.

The magneto-dielectric material can be formed by injection molding, reaction injection molding, extruding, casting compression molding, a rolling technique, and the like. A paste, grease, or slurry of the magneto-dielectric material can be prepared, for example, for use as a coating or a sealant.

For isotropic magneto-dielectric materials, the magneto-dielectric material can be formed in the absence of an external magnetic field. Conversely, for anisotropic magneto-dielectric materials, the magneto-dielectric material can be formed in the presence of an external magnetic field, such as a rotational magnetic field. The external magnetic field can be 1 to 20 kilooersteds (kOe).

The magneto-dielectric material can be formed using an injection molding process comprising injection molding a molten magnetic composition comprising a polymer and the hexaferrite microfibers. A method of forming the magneto-dielectric material can comprise forming a composition comprising a polymer and the hexaferrite microfibers; and thoroughly mixing the composition, wherein the polymer can be melted prior to mixing or after mixing.

The magneto-dielectric material can be prepared by reaction injection molding a thermosetting composition. The reaction injection molding can comprise mixing at least two streams to form a thermosetting composition and injecting the thermosetting composition into the mold, wherein a first stream can comprise a catalyst and the second stream can comprise an activating agent. One or both of the first stream and the second stream or a third stream can comprise a monomer. One or both of the first stream and the second stream or a third stream can comprise at least one of a crosslinking agent, the hexaferrite microfibers, and an additive. One or both of the hexaferrite microfibers and the additive can be added to the mold prior to injecting the thermosetting composition.

The mixing can occur in a head space of an injection molding machine. The mixing can occur in an inline mixer. The mixing can occur during injecting into the mold. The mixing can occur at a temperature of greater than or equal to 0 to 200 degrees Celsius (° C.), specifically, 15 to 130° C., or 0 to 45° C., more specifically, 23 to 45° C.

The mold can be maintained at a temperature of greater than or equal to 0 to 250° C., specifically, 23 to 200° C. or 45 to 250° C., more specifically, 30 to 130° C. or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kiloPascal (kPa). The molding can occur for less than or equal to 5 minutes, specifically, less than or equal to 2 minutes, more specifically, 2 to 30 seconds. After the polymerization is complete, the magneto-dielectric material can be removed at the mold temperature or at a decreased mold temperature. For example, the release temperature, $T_r$, can be less than or equal to 10° C. less than the molding temperature, $T_m$ ($T_r \leq T_m - 10°$ C.).

After the magneto-dielectric material is removed from the mold, it can be post-cured. Post-curing can occur at a temperature of 100 to 150° C., specifically, 140 to 200° C. for greater than or equal to 5 minutes.

The magneto-dielectric material can be a reinforced magneto-dielectric material, for example, comprising a glass cloth. The reinforced magneto-dielectric material can be formed by impregnating and laminating a composition comprising the polymer and the hexaferrite microfibers onto a reinforcing medium. The reinforcing medium can be fibrous, for example, a woven or a non-woven fibrous layer. The reinforcing medium can have macroscopic voids allowing for the composition to impregnate the reinforcing medium. The reinforcing medium can comprise a glass cloth.

The magneto-dielectric material can comprise a conductive layer. The conductive layer can comprise copper. The conductive layer can have a thickness of 3 to 200 micrometers, specifically, 9 to 180 micrometers. Suitable conductive layers include a thin layer of a conductive metal such as a copper foil presently used in the formation of circuits, for example, electrodeposited copper foils. The copper foil can have a root mean squared (RMS) roughness of less than or equal to 2 micrometers, specifically, less than or equal to 0.7 micrometers, where roughness is measured using a Veeco Instruments WYCO Optical Profiler, using the method of white light interferometry.

The conductive layer can be applied by placing the conductive layer in the mold prior to molding, by laminating the conductive layer onto the magneto-dielectric material, by direct laser structuring, or by adhering the conductive layer to the substrate via an adhesive layer. For example, a laminated substrate can comprise an optional polyfluorocarbon film that can be located in between the conductive layer and the magneto-dielectric material, and a layer of microglass reinforced fluorocarbon polymer that can be located in between the polyfluorocarbon film and the conductive layer. The layer of microglass reinforced fluorocarbon polymer can increase the adhesion of the conductive layer to the magneto-dielectric material. The microglass can be present in an amount of 4 to 30 wt % based on the total weight of the layer. The microglass can have a longest length scale of less than or equal to 900 micrometers, specifically, less than or equal to 500 micrometers. The microglass can be microglass of the type as commercially available by Johns-Manville Corporation of Denver, Colo. The polyfluorocarbon film comprises a fluoropolymer (such as polytetrafluoroethylene (PTFE), a fluorinated ethylene-propylene copolymer (such as Teflon FEP), and a copolymer having a tetrafluoroethylene backbone with a fully fluorinated alkoxy side chain (such as Teflon PFA)).

The conductive layer can be applied by laser direct structuring. Here, the magneto-dielectric material can comprise a laser direct structuring additive, a laser is used to irradiate the surface of the substrate, forming a track of the laser direct structuring additive, and a conductive metal is applied to the track. The laser direct structuring additive can comprise a metal oxide particle (such as titanium oxide and copper chromium oxide). The laser direct structuring additive can comprise a spinel-based inorganic metal oxide particle, such as spinel copper. The metal oxide particle can be coated, for example, with a composition comprising tin and antimony (for example, 50 to 99 wt % of tin and 1 to 50 wt % of antimony, based on the total weight of the coating).

The laser direct structuring additive can comprise 2 to 20 parts of the additive based on 100 parts of the respective composition. The irradiating can be performed with a YAG laser having a wavelength of 1,064 nanometers under an output power of 10 Watts, a frequency of 80 kilohertz (kHz), and a rate of 3 meters per second. The conductive metal can be applied using a plating process in an electroless plating bath comprising, for example, copper.

Alternatively, the conductive layer can be applied by adhesively applying the conductive layer. In an embodiment, the conductive layer is the circuit (the metallized layer of another circuit), for example, a flex circuit. For example, an adhesion layer can be disposed between one or both of the conductive layer(s) and the substrate. The adhesion layer can comprise a poly(arylene ether); and a carboxy-functionalized polybutadiene or polyisoprene polymer comprising butadiene, isoprene, or butadiene and isoprene units, and zero to less than or equal to 50 wt % of co-curable monomer units; wherein the composition of the adhesive layer is not the same as the composition of the substrate layer. The adhesive layer can be present in an amount of 2 to 15 grams per square meter. The poly(arylene ether) can comprise a carboxy-functionalized poly(arylene ether). The poly(arylene ether) can be the reaction product of a poly(arylene ether) and a cyclic anhydride, or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or maleinized polyisoprene-styrene copolymer. Other methods known in the art can be used to apply the conductive layer where admitted by the particular materials and form of the circuit material, for example, electrodeposition, chemical vapor deposition, lamination, or the like.

The conductive layer can be a patterned conductive layer. The magneto-dielectric material can comprise a first conductive layer and a second conductive layer located on opposite sides of the magneto-dielectric material.

An article can comprise the magneto-dielectric material. The article can be an antenna. The article can be a microwave device, such as an antenna or an inductor. The article can be a transformer, an antenna, an inductor, or an anti-electromagnetic interface material. The article can be an antenna such as a patch antenna, an inverted-F antenna, or a planar inverted-F antenna. The article can be a magnetic bus bar, for example, for wireless charging; an NFC shielding material; or an electronic bandgap meta-material.

The magneto-dielectric material can be used in microwave absorption or microwave shielding applications.

The article can be a multi-frequency article comprising the magneto-dielectric material and a dielectric material that comprises 0 to 2 vol % of the hexaferrite microfibers based on the total volume of the dielectric material. The dielectric material can comprise the same or different polymer as the magneto-dielectric material and a same or a different filler (for example, a dielectric filler or a flame retardant). The multi frequency article can be capable of being used as an antenna where the dielectric material operates at a first frequency range and a magneto-dielectric material operates at a second frequency range. For example, one of the magneto-dielectric material and the dielectric material can operate at frequencies of greater than or equal to a value of 1 to 2 GHz and the other can operate at frequencies of less than that value. The specific value of 1 to 2 can depend on the antenna type and the tolerance of the loss in that antenna.

Figure 6:
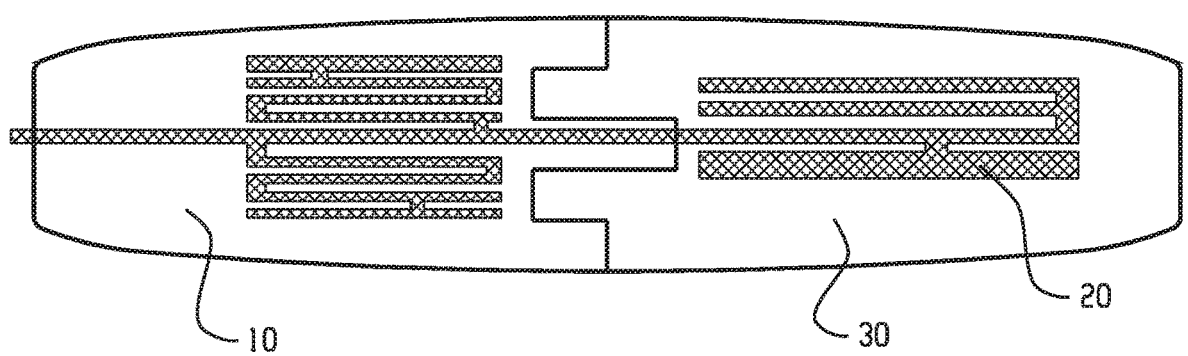
FIG. 6 is an illustration of an embodiment of a dual frequency magneto-dielectric material.

FIG. 6 is an illustration of a top view of a multi frequency magneto-dielectric material, where first conductive layer 20 is disposed on top of magneto-dielectric substrate 10 and dielectric substrate 30. FIG. 6 illustrates that the first conductive layer 20 can be asymmetrical with respect to magneto-dielectric substrate 10 and dielectric substrate 30. Conversely, first conductive layer 20 can be symmetrical on magneto-dielectric substrate 10 and dielectric substrate 30. For example, the conductive layer can be patterned on each of the magneto-dielectric substrate and the dielectric substrate based on the desired radiation frequency and the substrate characteristics to resonate and radiate in the desired frequency range. The multi frequency magneto-dielectric material can be formed by a two-shot injection molding process (for example, of a thermoplastic or a thermoset material by reaction injection molding) comprising first injection molding one of the magneto-dielectric material and the dielectric material and then, second injection molding the second of the magneto-dielectric material and the dielectric material.

Set forth below are non-limiting embodiments of a magneto-dielectric material comprising hexaferrite fibers, methods of making, and uses thereof.

Embodiment 1

A magneto-dielectric material comprising: a polymer matrix; and a plurality of hexaferrite microfibers; wherein the magneto-dielectric material has a permeability of 2.5 to 7, or 2.5 to 5 in an x-direction parallel to a broad surface of the magneto-dielectric material and a magnetic loss tangent of less than or equal to 0.03; as determined at 1 GHz, or 1 to 2 GHz.

Embodiment 2

The magneto-dielectric material of Embodiment 1, wherein the magneto-dielectric material comprises 10 to 60 vol % of the plurality of hexaferrite microfibers based on the total volume of the magneto-dielectric material.

Embodiment 3

The magneto-dielectric material of any one or more of the foregoing embodiments, wherein the plurality of hexaferrite microfibers comprises a Z-type hexaferrite, a W-type hexaferrite, a U-type hexaferrite, an X-type hexaferrite, a Y-type hexaferrite, or a combination comprising at least one of the foregoing; or wherein the plurality of hexaferrite microfibers comprises a Z-type hexaferrite.

Embodiment 4

The magneto-dielectric material of any one or more of the foregoing embodiments, wherein the plurality of hexaferrite microfibers comprises Ni, Co, Cr, Au, Ag, Cu, Gd, Pt, Ba, Bi, Ir, Mn, Mg, Mo, Nb, Nd, Sr, V, Zn, Zr, N, C, or a combination comprising at least one of the foregoing.

Embodiment 5

The magneto-dielectric material of any one or more of the foregoing embodiments, wherein the plurality of hexaferrite microfibers comprise a cobalt Z-type hexaferrite having the formula: $(Ba_zSr_{(3-z)})Co_{(2+x)}Mo_xFe_{(y-2x)}O_{41}$, wherein x is 0.01 to 0.2, y is 20 to 24, and z is 0 to 3.

Embodiment 6

The magneto-dielectric material of at least one of the foregoing embodiments, wherein the plurality of hexaferrite microfibers have an aspect ratio of a fiber length to a fiber diameter of greater than or equal to 10, or greater than or equal to 50.

Embodiment 7

The magneto-dielectric material of any one or more of the foregoing embodiments, wherein a plurality of hexaferrite microfibers have one or both of an average diameter of 0.3 to 10 micrometers, or 1 to 5 micrometers and an average length of 100 to 5,000 micrometers, or 500 to 3,000 micrometers.

Embodiment 8

The magneto-dielectric material of any one or more of the foregoing embodiments, wherein the plurality of hexaferrite microfibers comprises hollow hexaferrite microfibers.

Embodiment 9

The magneto-dielectric material of Embodiment 8, wherein the hollow hexaferrite microfibers have one or both of an average inner diameter of 0.01 to 1 micrometer and an average outer diameter of 0.3 to 20 micrometers.

Embodiment 10

The magneto-dielectric material of any one or more of the foregoing embodiments, wherein the plurality of hexaferrite microfibers comprise a plurality of grains having a grain size of 0.3 to 20 micrometers.

Embodiment 11

The magneto-dielectric material of any one or more of the foregoing embodiments, wherein the plurality of hexaferrite microfibers comprise a plurality of grains; wherein 50 to 100% by number of the grains are oriented along an x-y plane of the respective microfiber.

Embodiment 12

The magneto-dielectric material of any one or more of the foregoing embodiments, wherein the plurality of hexaferrite microfibers are oriented parallel to an x-y plane of the magneto-dielectric material.

Embodiment 13

The magneto-dielectric material of any one or more of the foregoing embodiments, wherein the plurality of hexaferrite microfibers are oriented parallel to an x-y plane of the magneto-dielectric material and in the x-direction.

Embodiment 14

The magneto-dielectric material of any one or more of the foregoing embodiments, wherein the permeability in the x-direction is 0.75 to 2 times greater than the permeability in the z-direction that is perpendicular to the broad surface.

Embodiment 15

The magneto-dielectric material of any one or more of the foregoing embodiments, wherein the magneto-dielectric material further comprises a dielectric filler, a flame retardant, or a combination comprising at least one of the foregoing.

Embodiment 16

The magneto-dielectric material of any one or more of the foregoing embodiments, further comprising a plurality of hollow ceramic tubes.

Embodiment 17

The magneto-dielectric material of any one or more of the foregoing embodiments, having one or more of an operating frequency of 1 to 2 GHz, 0.5 to 50 GHz; a permittivity of less than or equal to 10, or less than or equal to 8, as determined at 1 GHz, or 1 to 2 GHz; and a dielectric loss tangent of less than or equal to 0.005, or less than or equal to 0.001 as determined at 1 GHz, or 1 to 2 GHz.

Embodiment 18

The magneto-dielectric material of any one or more of the foregoing embodiments, further comprising a conductive layer.

Embodiment 19

The magneto-dielectric material of any one or more of the foregoing embodiments, wherein the polymer matrix comprises a polyolefin, a polyurethane, a polyethylene, a silicone polymer, a polyether, poly(phenylene sulfide), or a combination comprising at least one of the foregoing.

Embodiment 20

The magneto-dielectric material of any one or more of the foregoing embodiments, wherein the polymer matrix comprises a thermosetting polybutadiene or polyisoprene.

Embodiment 21

The magneto-dielectric material of any one or more of the foregoing embodiments, wherein the polymer matrix comprises a norbornene type polymer.

Embodiment 22

A method of making the magneto-dielectric material of any one or more of Embodiments 1 to 19, comprising: injection molding a composition comprising the polymer matrix and the plurality of hexaferrite microfibers; wherein the polymer matrix comprises a thermoplastic polymer.

Embodiment 23

A method of making the magneto-dielectric material of any one or more of Embodiments 1 to 21, comprising: reaction injection molding a composition comprising a thermosetting polymer matrix composition and the plurality of hexaferrite microfibers; wherein the polymer matrix comprises a thermoset polymer.

Embodiment 24

The method of any one or more of Embodiments 22 to 23, comprising forming, preferably injection molding or reaction injection molding the polymer matrix and the plurality of hexaferrite microfibers in the presence of a magnetic field.

Embodiment 25

An article comprising the magneto-dielectric material of any one or more of the foregoing embodiments.

Embodiment 26

The article of Embodiment 25, wherein the article is an antenna, a transformer, an anti-electromagnetic interface material, or an inductor.

Embodiment 27

The article of Embodiment 25, wherein the article is a microwave device.

Embodiment 28

The article of any one or more of Embodiments 25 to 27, comprising the magneto-dielectric material and a dielectric material that comprises 0 to 2 vol % of the plurality of hexaferrite microfibers based on the total volume of the dielectric material.

The terms "a" and "an" do not denote a limitation of quantity, but rather denote the presence of at least one of the referenced item. The term "or" means "and/or" unless clearly indicated otherwise by context. Reference throughout the specification to "an embodiment", "another embodiment", "some embodiments", and so forth, means that a particular element (e.g., feature, structure, step, or characteristic) described in connection with the embodiment is included in at least one embodiment described herein, and may or may not be present in other embodiments. The term "combination" is inclusive of blends, mixtures, alloys, reaction products, and the like.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points, for example, ranges of "up to 25 wt %, or 5 to 20 wt %" are inclusive of the endpoints and all intermediate values of the ranges of "5 to 25 wt %," such as 10 to 23 wt %, etc. Unless defined otherwise, technical and scientific terms used herein have the same meaning as is commonly understood by one of skill in the art to which this disclosure belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While certain combinations of features have been described herein, it will be appreciated that these certain combinations are for illustration purposes only and that any combination of any of these features can be employed, explicitly or equivalently, either individually or in combination with any other of the features disclosed herein, in any combination, and all in accordance with an embodiment. Any and all such combinations are contemplated herein and are considered within the scope of the disclosure.

While the disclosure has been described with reference to exemplary embodiments, it will be understood by those skilled in the art that various changes can be made and equivalents can be substituted for elements thereof without departing from the scope of this disclosure. In addition, many modifications can be made to adapt a particular situation or material to the teachings without departing from the essential scope thereof. Therefore, it is intended that the disclosure not be limited to the particular embodiment disclosed as the best or only mode contemplated for carrying out this disclosure, but that the disclosure will include all embodiments falling within the scope of the appended claims. Also, in the drawings and the description, there have been disclosed exemplary embodiments and, although specific terms may have been employed, they are, unless otherwise stated, used in a generic and descriptive sense only and not for purposes of limitation.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A magneto-dielectric material comprising:
   a polymer matrix; and
   a plurality of hexaferrite microfibers;
   wherein the magneto-dielectric material has a permeability of 2.5 to 7 in an x-direction parallel to a broad surface of the magneto-dielectric material, and
   a magnetic loss tangent of less than or equal to 0.03; as determined at 1 GHz.

2. The magneto-dielectric material of claim 1, wherein the magneto-dielectric material comprises 10 to 60 vol % of the plurality of hexaferrite microfibers based on the total volume of the magneto-dielectric material.

3. The magneto-dielectric material of claim 1, wherein the plurality of hexaferrite microfibers comprises a Z-type hexaferrite, a W-type hexaferrite, a U-type hexaferrite, an X-type hexaferrite, a Y-type hexaferrite, or a combination comprising at least one of the foregoing; or wherein the plurality of hexaferrite microfibers comprises a Z-type hexaferrite.

4. A magneto-dielectric material comprising,
   a polymer matrix; and
   a plurality of hexaferrite microfibers; wherein the plurality hexaferrite microfibers comprise a cobalt Z-type hexaferrite having the formula:
   $(Ba_zSr_{(3-z)})Co_{(2+x)}Mo_xFe_{(y-2x)}O_{41}$ wherein x is 0.01 to 0.2, y is 20 to 24, and z is 0 to 3;
   wherein the magneto-dielectric material has a permeability of 2.5 to 7 in an x-direction parallel to a broad surface of the magneto-dielectric material and a magnetic loss tangent of less than or equal to 0.03; as determined at 1 GHz.

5. The magneto-dielectric material of claim 1, wherein the plurality hexaferrite microfibers have an aspect ratio of greater than 50.

6. The magneto-dielectric material of claim 1, wherein the plurality of hexaferrite microfibers have
   an average diameter of 0.3 to 10 micrometers and
   an average length of 100 to 5,000 micrometers.

7. The magneto-dielectric material of claim 1, wherein the plurality of hexaferrite microfibers comprise a plurality of grains having a grain size of 0.3 to 20 micrometers; wherein 50 to 100% by number of the grains are oriented along an x-y plane of the respective microfiber.

8. The magneto-dielectric material of claim 1, wherein the plurality of hexaferrite microfibers are oriented parallel to an x-y plane of the magneto-dielectric material.

9. The magneto-dielectric material of claim 1, wherein the permeability of the magneto-dielectric material in the x-direction is 0.75 to 2 times greater than the permeability in the z-direction that is perpendicular to the broad surface.

10. The magneto-dielectric material of claim 1, having one or more of
    an operating frequency of 1 GHz;
    a permittivity of less than or equal to 10 as determined at 1 GHz; and
    a dielectric loss tangent of less than or equal to 0.005 as determined at 1 GHz.

11. The magneto-dielectric material of claim 1, further comprising a conductive layer disposed on a surface of the magneto-dielectric material.

12. The magneto-dielectric material of claim 1, wherein the polymer matrix comprises a polyolefin, a polyurethane, a silicone, a polyether, poly(phenylene sulfide), or a combination comprising at least one of the foregoing.

13. The magneto-dielectric material of claim 1, wherein the polymer matrix comprises a thermoset polybutadiene or polyisoprene or a thermoset polynorbornene.

14. A method of making the magneto-dielectric material of claim 1, comprising:
    injection molding the polymer matrix and the plurality of hexaferrite microfibers, wherein the polymer matrix comprises a thermoplastic polymer; or
    reaction injection molding a thermosetting polymer precursor composition and the plurality of hexaferrite microfibers.

15. The method of claim 14, comprising injection molding or reaction injection molding the polymer matrix and the plurality of hexaferrite microfibers in the presence of a magnetic field.

16. An article comprising the magneto-dielectric material of claim 1.

17. The article of claim 16, wherein the article is an antenna, a transformer, or an inductor.

18. The article of claim 17, wherein the article is a microwave device.

19. The article of claim 16, comprising the magneto-dielectric material and a dielectric material that comprises 0 to 2 vol % of the plurality of hexaferrite microfibers based on the total volume of the dielectric material.

20. An article comprising a magneto-dielectric material; wherein the magneto-dielectric material comprises:
    a polymer matrix; and a plurality of z-type hexaferrite microfibers having an average diameter of 0.3 to 10 micrometers, an average length of 500 to 5,000 micrometers, and an aspect ratio of greater than or equal to 10;

wherein the magneto-dielectric material has a permeability of 2.5 to 7 in an x-direction parallel to a broad surface of the magneto-dielectric material, and a magnetic loss tangent of less than or equal to 0.03; as determined at 1 GHz; and wherein the article is an antenna.

* * * * *